United States Patent
Ishibashi et al.

(10) Patent No.: US 12,097,783 B2
(45) Date of Patent: Sep. 24, 2024

(54) VEHICLE POWER SUPPLY SYSTEM

(71) Applicant: Mazda Motor Corporation, Hiroshima (JP)

(72) Inventors: Masato Ishibashi, Hiroshima (JP); Takeshi Matsukawa, Hiroshima (JP); Shinsuke Yoshitake, Hiroshima (JP); Daisuke Hamano, Hiroshima (JP); Shingo Hirose, Hiroshima (JP); Keita Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 84 days.

(21) Appl. No.: 17/970,671

(22) Filed: Oct. 21, 2022

(65) Prior Publication Data

US 2023/0134343 A1 May 4, 2023

(30) Foreign Application Priority Data

Oct. 29, 2021 (JP) ................................ 2021-177230

(51) Int. Cl.
*B60L 58/20* (2019.01)
*B60R 16/033* (2006.01)
*H02J 7/00* (2006.01)

(52) U.S. Cl.
CPC ............ *B60L 58/20* (2019.02); *B60R 16/033* (2013.01); *H02J 7/0013* (2013.01); *H02J 7/0063* (2013.01);
(Continued)

(58) Field of Classification Search
CPC ........ B60L 58/20; B60L 2210/14; B60L 1/00; B60L 3/12; B60L 50/60; B60L 53/22;
(Continued)

(56) References Cited

U.S. PATENT DOCUMENTS 6,104,165 A * 8/2000 Miyamoto ............ H01M 10/44
320/136
10,800,283 B2 10/2020 Jang et al.
(Continued)

FOREIGN PATENT DOCUMENTS

JP 2020-160661 A 10/2020

OTHER PUBLICATIONS

Extended European search report issued on Feb. 27, 2023, in corresponding European patent Application No. 22202063.8, 13 pages.

(Continued)

*Primary Examiner* — Elim Ortiz
(74) *Attorney, Agent, or Firm* — XSENSUS LLP

(57) ABSTRACT

A vehicle power supply system includes a first secondary battery, a second secondary battery whose output voltage is lower than that of the first secondary battery, a power conversion device configured to convert an input AC voltage into a DC voltage and output the DC voltage, a battery pack configured to receive the DC power output from the power conversion device and charge the first secondary battery, DC/DC converters configured to step down an input DC voltage to output the stepped-down DC voltage, and a power control unit configured to control the battery pack. The first secondary battery is connected to input ports of the DC/DC converters via the battery pack. An output port of the DC/DC converter is connected to a video media control unit, and the DC/DC converter is provided separately from the video media control unit. An output port of the DC/DC converter is connected to the second secondary battery.

8 Claims, 6 Drawing Sheets

(52) U.S. Cl.
CPC ....... *B60L 2210/14* (2013.01); *B60Y 2200/91* (2013.01); *H02J 2207/20* (2020.01); *H02J 2310/48* (2020.01)

(58) Field of Classification Search
CPC ........ B60L 58/12; B60L 58/10; B60R 16/033; H02J 7/0013; H02J 7/0063; H02J 2207/20; H02J 2310/48; H02J 7/0068; H02J 7/342; H02J 7/02; B60Y 2200/91; Y02T 10/70; Y02T 10/7072
See application file for complete search history.

(56) References Cited

U.S. PATENT DOCUMENTS

| | | | |
|---|---|---|---|
| 2018/0001772 A1* | 1/2018 | Jang | B60L 1/00 |
| 2020/0094687 A1* | 3/2020 | Ing | B60L 53/22 |
| 2021/0284043 A1 | 9/2021 | Wang et al. | |

OTHER PUBLICATIONS

Yue Cao et al., "Mobile Edge Computing for Big-Data-Enabled Electric Vehicle Charging", IEEE Communications Magazine, vol. 56, No. 3, Mar. 1, 2018, pp. 150-156.
Kenichi Mase, "Information and Communication Technology and Electric Vehicles—Paving the Way towards a Smart Community", IEICE Transaction on Communication, Communications Society, vol. E95-B, No. 6, Jun. 1, 2012, pp. 1902-1910, Tokyo, Japan.

* cited by examiner

FIG.5

| CONNECTION STATE OF CHARGER | CONNECTED TO CHARGER | | | | | |
|---|---|---|---|---|---|---|
| CONTROL STATE | ONLY CHARGING OF FIRST SECONDARY BATTERY (FIRST MODE) | | SIMULTANEOUS EXECUTION OF CHARGING OF FIRST SECONDARY BATTERY AND MPU COMPUTATION (SECOND MODE) | | ONLY MPU COMPUTATION (THIRD MODE) | |
| | HIGH | LOW | HIGH | LOW | HIGH | LOW |
| POWER STATE OF SECOND SECONDARY BATTERY | — | — | — | — | — | — |
| POWER SUPPLY SOURCE FOR MPU | — | — | SECOND SECONDARY BATTERY | CHARGER | SECOND SECONDARY BATTERY | CHARGER |
| POWER SUPPLY SOURCE FOR FIRST SECONDARY BATTERY | CHARGER | CHARGER | CHARGER | CHARGER | — | — |
| POWER SUPPLY SOURCE FOR SECOND SECONDARY BATTERY | — | — | — | — | — | — |
| OPERATION STATE OF OBC | ○ | ○ | ○ | ○ | ○(PART) | ○ |
| OPERATION STATE OF FIRST SECONDARY BATTERY | ○ | ○ | ○ | ○ | × | × |
| STATE OF POWER SUPPLY TO MPU | × | × | ○ | ○ | ○ | ○ |

CIRCLE MARK MEANS OPERATING STATE, AND CROSS MARK MEANS STOP STATE.

FIG.6

| CONNECTION STATE OF CHARGER | CONNECTED TO CHARGER | | NOT CONNECTED TO CHARGER | | | |
|---|---|---|---|---|---|---|
| CONTROL STATE | ONLY CHARGING OF SECOND SECONDARY BATTERY (FOURTH MODE) | | SIMULTANEOUS EXECUTION OF CHARGING OF SECOND SECONDARY BATTERY AND MPU COMPUTATION (FIFTH MODE) | | ONLY MPU COMPUTATION (SIXTH MODE) | |
| POWER STATE OF SECOND SECONDARY BATTERY | HIGH | LOW | HIGH | LOW | HIGH | LOW |
| POWER SUPPLY SOURCE FOR MPU | – | – | SECOND SECONDARY BATTERY | FIRST SECONDARY BATTERY | SECOND SECONDARY BATTERY | FIRST SECONDARY BATTERY |
| POWER SUPPLY SOURCE FOR FIRST SECONDARY BATTERY | FIRST SECONDARY BATTERY | FIRST SECONDARY BATTERY | FIRST SECONDARY BATTERY | FIRST SECONDARY BATTERY | – | – |
| POWER SUPPLY SOURCE FOR SECOND SECONDARY BATTERY | x | x | x | x | x | x |
| OPERATION STATE OF OBC | ○ | ○ | ○ | ○ | x | ○ |
| OPERATION STATE OF FIRST SECONDARY BATTERY | x | x | ○ | ○ | ○ | ○ |
| STATE OF POWER SUPPLY TO MPU | | | | | | |

CIRCLE MARK MEANS OPERATING STATE, AND CROSS MARK MEANS STOP STATE.

VEHICLE POWER SUPPLY SYSTEM

CROSS-REFERENCE TO RELATED APPLICATION

This application claims priority to Japanese Patent Application No. 2021-177230 filed on Oct. 29, 2021, the entire disclosure of which is incorporated by reference herein.

BACKGROUND

The present disclosure relates to a vehicle power supply system.

Some vehicles are equipped with computers capable of performing grid computing (see, e.g., Patent Document 1). In an example of Japanese Unexamined Patent Publication No. 2020-160661, a signal indicating permission to participate in the grid computing is transmitted to a management server according to user's vehicle engine OFF operation or power OFF operation.

SUMMARY

In Japanese Unexamined Patent Publication No. 2020-160661, device power consumption management (particularly, power consumption reduction) is not taken into consideration much.

An object of the present aspect is to reduce power consumption in a vehicle.

In order to achieve the object, in the technique disclosed herein, a vehicle power supply system includes a first secondary battery, a second secondary battery whose output voltage is lower than that of the first secondary battery, a DC power supply unit configured to convert an input AC voltage into a DC voltage to output the DC voltage, a battery pack configured to receive the DC power output from the DC power supply unit and charge the first secondary battery, a first step-down circuit configured to step down an input DC voltage to output the stepped-down DC voltage, a second step-down circuit configured to step down an input DC voltage to output the stepped-down DC voltage, and a control device configured to control the battery pack. The first secondary battery is connected to an input port of the first step-down circuit and an input port of the second step-down circuit via the battery pack. An output port of the first step-down circuit is connected to a computer, and the first step-down circuit is provided separately from the computer. An output port of the second step-down circuit is connected to the second secondary battery.

According to the above-described aspect, the power is distributed by the control device and the battery pack; therefore, power consumption in a vehicle can be reduced. Further, the first step-down circuit and the computer are provided separately; therefore, the degree of freedom in vehicle design is improved.

The control device may have a control mode of controlling the battery pack to supply the output of the DC power supply unit to the first secondary battery.

According to the above-described aspect, the first secondary battery can be charged with the power from the DC power supply unit.

The control device may have a control mode of controlling the battery pack to supply the output of the DC power supply unit to the computer.

According to the above-described aspect, the power from the DC power supply unit can be supplied to the computer.

The control device may have a control mode of supplying the power of the second secondary battery to the computer in a case where the power of the second secondary battery is equal to or greater than a predetermined value.

According to the above-described aspect, the power from the second secondary battery can be supplied to the computer.

The control device may have a control mode of supplying the power of the second secondary battery to the computer in a case where the power of the second secondary battery is equal to or greater than the predetermined value.

According to the above-described aspect, the second secondary battery can be charged with the power from the first secondary battery.

According to the present disclosure, power consumption in the vehicle can be reduced.

BRIEF DESCRIPTION OF DRAWINGS

FIG. 5 is a table for describing power control in a case where the vehicle is connected to a normal charger.

FIG. 6 is a table for describing the power control in a case where the vehicle is not connected to the normal charger.

DETAILED DESCRIPTION

[Embodiment]

Figure 1:
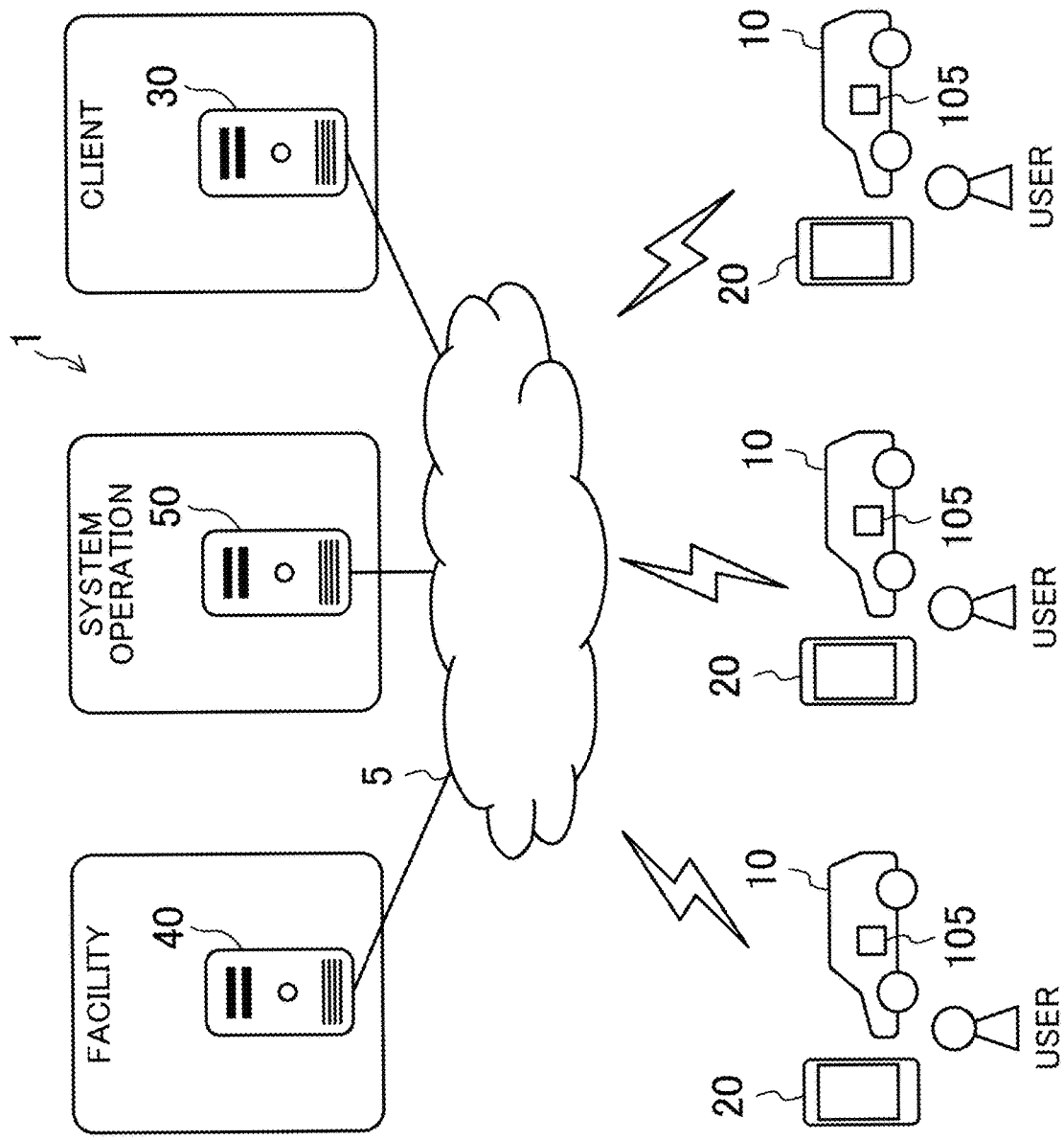
FIG. 1 is a diagram showing, as an example, a configuration of a system of an embodiment.

Hereinafter, a vehicle power supply system according to the present embodiment will be described with reference to the drawings. The vehicle power supply system of the present embodiment is mounted on a vehicle. The vehicle is connected to a system 1 (described later). Thus, the system 1 will be described. Note that the same or corresponding parts are denoted by the same reference characters in the drawings, and the description thereof will not be repeated.

«System 1»

FIG. 1 shows, as an example, a configuration of the system 1 in the present embodiment. The system 1 includes a plurality of vehicles 10, a plurality of user terminals 20, a client server 30, a facility server 40, and a management server 50.

The client server 30 is owned by a client. The client requests the management server 50 to calculate job data. Examples of such a client include a company, a research institution, an educational institution, etc. The facility server 40 is owned by a facility. A user visits the facility.

The user can make a reservation for visiting the facility. Examples of such a facility include a stadium, a theater, a supermarket, a restaurant, an accommodation, a store, etc. The management server 50 manages operation (e.g., job assignment) of the system 1 in which grid computing is built. The management server 50 is owned by a business operator operating the system 1.

These components can communicate with each other via a communication network 5. Each vehicle 10 is equipped with an arithmetic unit 105 (trip computer). Note that a plurality of client servers 30 may be provided in the system 1. Similarly, a plurality of facility servers 40 may be provided in the system 1.

[Grid Computing]

Figure 2:
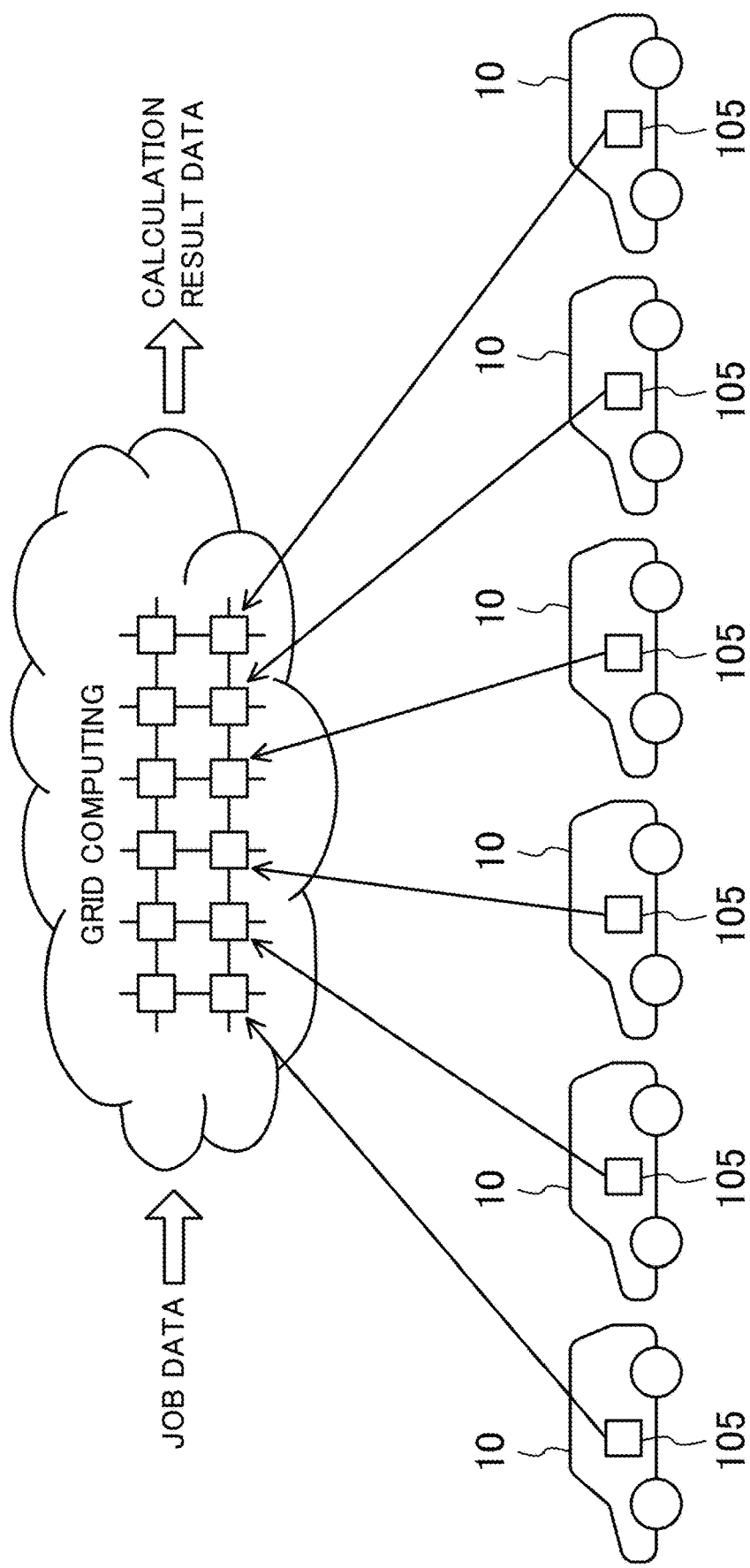
FIG. 2 is a diagram for describing the concept of grid computing.

FIG. 2 is a diagram for describing the concept of grid computing. As shown in FIG. 2, in the system 1, grid computing is built by the plurality of arithmetic units 105. In the system 1, a process (a grid computing process) of causing an available one of the plurality of arithmetic units 105 to process the job data is performed.

Note that when the computing power of the arithmetic unit 105 is required in the vehicle 10, the arithmetic unit 105 enters an operating state. That is, the computing power of the arithmetic unit 105 is utilized. For example, when the computing power of the arithmetic unit 105 is required for controlling travelling of the vehicle 10, the arithmetic unit 105 enters the operating state.

On the other hand, when the computing power of the arithmetic unit 105 is no longer necessary in the vehicle 10, the arithmetic unit 105 enters a stop state. That is, in the vehicle 10, the computing power of the arithmetic unit 105 is not utilized.

Here, in the vehicle 10, when the computing power of the arithmetic unit 105 is unnecessary, the computing power of the arithmetic unit 105 is provided to the grid computing process. With this configuration, the computing power of the arithmetic unit 105 can be effectively utilized.

[Vehicle]

The vehicle 10 (a computer system) is owned by the user. The user drives the vehicle 10 in some cases. In this example, the vehicle 10 is a four-wheeled motor vehicle. Examples of the vehicle 10 include an electric vehicle, a plug-in hybrid motor vehicle, etc.

Figure 3:
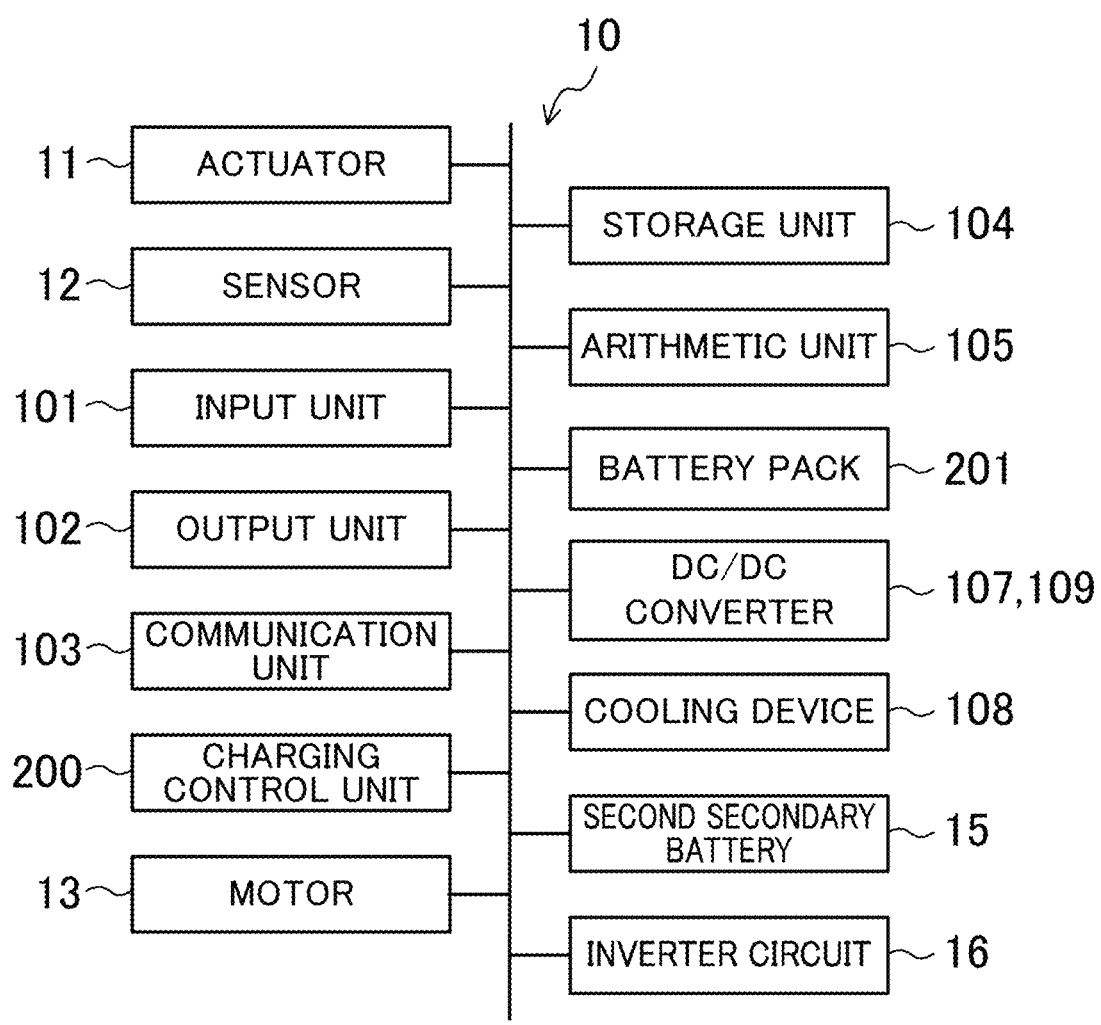
FIG. 3 is a block diagram showing, as an example, a configuration (an excerpt) of a vehicle.
Figure 4:
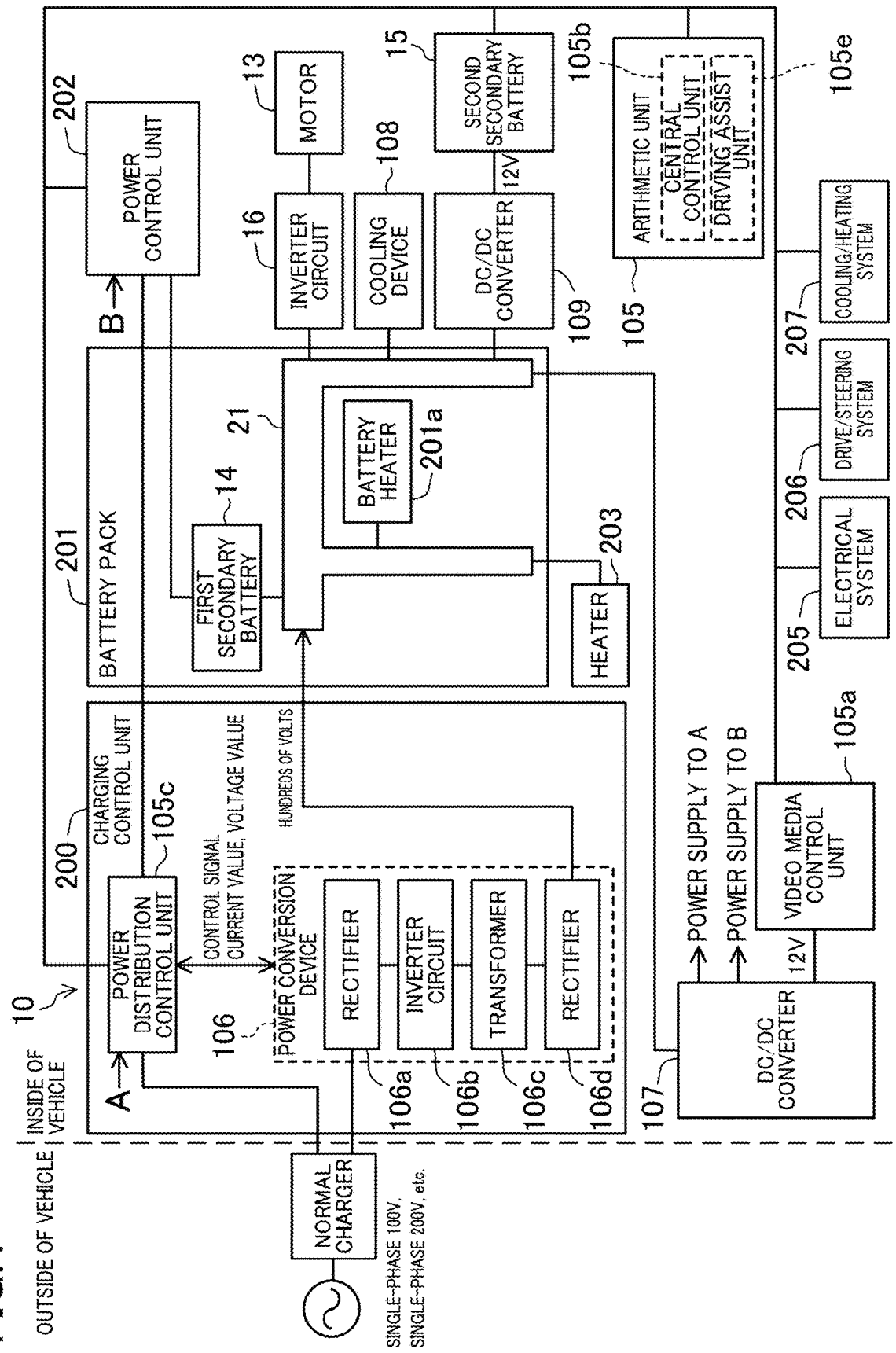
FIG. 4 is a block diagram showing a configuration of a charging control unit etc.

FIG. 3 is a block diagram showing, as an example, a configuration (an excerpt) of the vehicle. FIG. 4 is a block diagram showing a configuration of a charging control unit 200 (see FIG. 3) etc. As shown in FIGS. 3 and 4, the vehicle 10 includes an actuator 11, a sensor 12, a motor 13, a battery pack 201 (including a first secondary battery 14 described later), a second secondary battery 15, an inverter circuit 16, an input unit 101, an output unit 102, a communication unit 103, a storage unit 104, the arithmetic unit 105, a DC/DC converter 109, a cooling device 108, the charging control unit 200, a power control unit 202, a heater 203, an electrical system 205, a drive/steering system 206, and a cooling/heating system 207.

The inverter circuit 16 converts an input DC voltage into an AC voltage having a predetermined frequency and a predetermined voltage, and outputs the AC voltage. The output (the three-phase AC voltage) of the inverter circuit 16 is supplied to a motor (the motor 13) for driving the vehicle.

The voltage of the second secondary battery 15 is 12 V. The power of the second secondary battery 15 is supplied to a computer (e.g., a central control unit 105b described later) etc.

The actuator 11 includes, for example, a steering actuator, a braking actuator, etc. Examples of the braking actuator include a brake. Examples of the steering actuator include a steering.

The sensor 12 acquires various types of information used for controlling the vehicle 10. Examples of the sensor 12 include an external camera, an internal camera, a radar, a vehicle speed sensor, an acceleration sensor, a yaw rate sensor, an accelerator position sensor, a steering sensor, a brake hydraulic sensor, etc. The external camera images the outside of the vehicle. The internal camera images the inside of the vehicle. The radar searches outside the vehicle.

The input unit 101 inputs information and data. Examples of the input unit 101 include an operation unit operated to input information according to the operation, a camera inputting an image indicating information, a microphone inputting sound indicating information, etc. Examples of the operation unit include an operation button and a touch sensor of a car navigation device etc. The information and data input to the input unit 101 are transmitted to the arithmetic unit 105.

The output unit 102 outputs information and data. Examples of the output unit 102 include a display unit outputting an image indicating information, a speaker outputting sound indicating information, etc. Examples of the display unit include a display of a car navigation device. Examples of the speaker include a speaker of a car navigation device.

The communication unit 103 transmits and receives information and data. The information and data received by the communication unit 103 are transmitted to the arithmetic unit 105. In the present embodiment, the user can provide (transmit) an instruction on an operation mode (described later) in the case of connection with a normal charger to the communication unit 103. In this example, the user can send the instruction from the user terminal 20 to the communication unit 103 via wireless communication.

The storage unit 104 stores information and data.

The battery pack 201 includes the first secondary battery 14 and a battery heater 201a. The voltage of the first secondary battery 14 is hundreds of volts (e.g., 200 V). The output voltage of the first secondary battery 14 is higher than the output voltage of the second secondary battery 15. The power of the first secondary battery 14 is input to the inverter circuit 16. The first secondary battery 14 may be normally charged, or may be rapidly charged.

The battery heater 201a is a heater for adjusting the temperature of the first secondary battery 14. The battery heater 201a receives the power supplied from the first secondary battery 14.

The cooling device 108 cools the arithmetic unit 105 and the first secondary battery 14. Specifically, the cooling device 108 cools the first secondary battery 14 with water. The cooling device 108 also air-conditions the inside of the vehicle (the inside of a room). In other words, the cooling device 108 has a water cooling function and an air-conditioning function. Using these functions, the cooling device 108 cools part of the arithmetic unit 105 with water, and cools another part of the arithmetic unit 105 with air.

In order to implement the water cooling function and the air-conditioning function, the cooling device 108 includes a condenser, an evaporator, a chiller, a pump, etc. (any of these components is not shown). Operation of the cooling device 108 is controlled by the arithmetic unit 105.

The arithmetic unit 105 includes a plurality of control units (computers). In this example, the arithmetic unit 105 includes, as the control units, a video media control unit 105a (non trip computer), the central control unit 105b, and a driving assist unit 105e (see FIG. 4). Note that although the video media control unit 105a is a computer forming the arithmetic unit 105, the video media control unit 105a is independently shown in FIG. 4 for the sake of convenience in illustration.

Some of these computers are allowed to participate in the grid computing, and the other computers are not allowed to participate in the grid computing. Power is supplied from the second secondary battery 15 to the central control unit 105b and the driving assist unit 105e.

The video media control unit 105a (the computer) includes a media processing unit (MPU). The MPU is a device including a processor for processing image data. Note that the video media control unit 105a may allow the user to select whether or not the video media control unit 105a is attached upon, e.g., purchase of the vehicle 10.

When the MPU executes a predetermined program, the video media control unit 105a processes video captured by the internal camera and video (image data) captured by the external camera. For example, the MPU can automatically edit the image data by executing the program. Note that the video media control unit 105a communicates, in some cases, with the central control unit 105b and the driving assist unit 105e via a local area network (e.g., Ethernet).

The MPU is a processor having a relatively high computing power. The video media control unit 105a (the MPU) is allowed to participate in the grid computing.

An electronic component of the video media control unit 105a is cooled by the cooling device 108. For example, a predetermined semiconductor element forming the video media control unit 105a is cooled with water by the cooling device 108. Cold air is injected from the cooling device 108 into a housing that houses the video media control unit 105a. In other words, the video media control unit 105a is cooled with air by the cooling device 108.

The video media control unit 105a can control the cooling device 108 by executing the program. The video media control unit 105a can adjust the capacity of the cooling device 108 to cool the video media control unit 105a itself.

The central control unit 105b includes one or more central processing units (CPUs). The central control unit 105b controls the vehicle 10 by the CPUs executing a predetermined program while the vehicle 10 is traveling. In principle, the central control unit 105b does not operate the vehicle 10 while the vehicle 10 is parked.

For example, the central control unit 105b controls the driving actuator (the motor 13) according to various types of information obtained by the sensor 12. The central control unit 105b also controls the cooling device 108 (e.g., control of air-conditioning in the vehicle). The central control unit 105b is not allowed to participate in the grid computing. Note that, e.g., the CPUs of the central control unit 105b are cooled by the cooling device 108 as in the video media control unit 105a.

The driving assist unit 105e includes one or more CPUs. The driving assist unit 105e controls each function in preventive driving assistance in such a manner that the CPUs execute a predetermined program. In principle, the driving assist unit 105e does not operate while the vehicle 10 is parked.

For example, the driving assist unit 105e causes the vehicle 10 to follow a preceding vehicle, evaluate a status relating to an advanced emergency braking system, and controls the brake. The driving assist unit 105e is not allowed to participate in the grid computing.

A component group including the second secondary battery 15, the inverter circuit 16, the video media control unit 105a, the DC/DC converter 109, the charging control unit 200, the battery pack 201, and the power control unit 202 may also be referred to as a vehicle power supply system.

The charging control unit 200 manages charging of the first secondary battery 14, for example. The charging control unit 200 is connected to the normal charger during normal charging. The normal charger is, for example, a commercial power supply. The commercial power supply is, for example, a single-phase 100V or 200V AC power supply.

The charging control unit 200 includes, as components, a power distribution control unit 105c (a control device) and a power conversion device 106 (a DC power supply unit). Each component of the charging control unit 200 is housed in a single housing. Each component of the charging control unit 200 may be mounted on the same substrate.

The power conversion device 106 is connected to the normal charger upon normal charging. The power conversion device 106 converts an input AC voltage into a DC voltage, and outputs the DC voltage. Operation of the power conversion device 106 is controlled by the power distribution control unit 105c. The power conversion device 106 includes a rectifier 106a, an inverter circuit 106b, a transformer 106c, and a rectifier 106d.

The rectifier 106a (an AC/DC converter) rectifies an AC voltage input from the normal charger, and outputs a DC voltage. The rectifier 106a may include a diode bridge circuit, for example.

The inverter circuit 106b (a DC/AC converter) converts the DC voltage output from the rectifier 106a into an AC voltage having predetermined voltage and frequency. The output of the inverter circuit 106b is input to the transformer 106c.

The transformer 106c (a booster) boosts the AC voltage output from the inverter circuit 106b. The output voltage of the transformer 106c is hundreds of volts (e.g., about 200 V). The output of the transformer 106c is input to the rectifier 106d.

The rectifier 106d (an AC/DC converter) converts the AC voltage output from the transformer 106c into a DC voltage. The output voltage of the rectifier 106d is a DC voltage (e.g., 200 V) suitable for charging the first secondary battery 14. The rectifier 106d may include a diode bridge circuit, for example.

The power conversion device 106 converts an AC voltage input via an input port into a specified DC voltage, and outputs the DC voltage to an output port (specifically, an output port of the rectifier 106d). Control of (instruction for) the power conversion device 106 is performed by the power distribution control unit 105c.

The first secondary battery 14 is connected to an output port of the power conversion device 106. The power conversion device 106 can control ON/OFF of a power supply to the first secondary battery 14. Such ON/OFF control is performed by the power distribution control unit 105c.

A DC/DC converter 107 is a step-down circuit (a first step-down circuit). The DC/DC converter 107 includes at least one input port and a plurality of output ports. A voltage output via each output port is 12 V. The DC/DC converter 107 may control the magnitude of power at each output port. The power at the output port of the DC/DC converter 107 is zero (i.e., an OFF state) in some cases.

The input port of the DC/DC converter 107 is connected to the output port of the power conversion device 106 and the first secondary battery 14 via a bus 21 in the battery pack 201. In the present embodiment, a destination to which the power of the DC/DC converter 107 is supplied includes the video media control unit 105a, the power distribution control unit 105c, and the power control unit 202.

Here, in the present embodiment, the DC/DC converter 107 is provided outside the video media control unit 105a. That is, the DC/DC converter 107 and the video media control unit 105a are provided separately.

The DC/DC converter 109 is a step-down circuit (a second step-down circuit). The first secondary battery 14 is connected to an input port of the DC/DC converter 109 via the bus 21 in the battery pack 201. A voltage output via an output port of the DC/DC converter 109 is 12 V. The DC/DC converter 109 can control ON/OFF of the output. The second secondary battery 15 is connected to the output port of the DC/DC converter 109.

The power control unit 202 includes a CPU. The power control unit 202 monitors the first secondary battery 14 and controls a relay in the battery pack 201 in such a manner that the CPU executes a predetermined program, for example. For example, the power control unit 202 also checks and diagnoses the temperature, current, voltage, etc. of a cell of the first secondary battery 14. Moreover, the power control unit 202 also controls the DC/DC converter 109. Specifically, the power control unit 202 switches ON/OFF of the output of the DC/DC converter 109. Note that the first secondary battery 14, the DC/DC converter 109, and the video media control unit 105a are connected to each other via a line formed in the battery pack 201.

The heater 203 is a heater for air-conditioning the inside of the vehicle. The heater 203 receives the power supplied from the first secondary battery 14. The electrical system 205, the drive/steering system 206, the cooling/heating system 207, etc. are electrical components provided in the vehicle 10. These electrical components receive the power supplied from the second secondary battery 15.

«Operation Example (Power Control Example)»

Power control in the vehicle 10 (the computer system) will be described for each of a case where the vehicle 10 is connected to the normal charger and a case where the vehicle 10 is not connected to the normal charger.

<Case where Vehicle 10 is Connected to Normal Charger>

When the vehicle 10 is connected to the normal charger, power is supplied from the normal charger to the charging control unit 200 (more precisely, the power conversion device 106). In the vehicle 10, the following three modes can be selected as the operation mode in a case where the vehicle 10 is connected to the normal charger.

(1) A mode (a first mode) in which the first secondary battery 14 is charged, but the video media control unit 105a does not participate in the grid computing.
(2) A mode (a second mode) in which both charging of the first secondary battery 14 and participation of the video media control unit 105a in the grid computing are performed.
(3) A mode (a third mode) in which the first secondary battery 14 is not charged, but the video media control unit 105a participates in the grid computing.

FIG. 5 is a table for describing the power control in a case where the vehicle 10 is connected to the normal charger (abbreviated as "CHARGER" in the drawing). In FIG. 5, an on board charger (OBC) means the charging control unit 200 (the same also applies to other drawings). Moreover, in FIG. 5, a circle mark means a state in which a corresponding device operates, and a cross mark means a state in which a corresponding device is stopped. Further, "MPU COMPUTATION" means that the video media control unit 105a participates in the grid computing (the same also applies to other drawings).

In FIG. 5, "POWER STATE OF SECOND SECONDARY BATTERY" being "HIGH" means that the second secondary battery 15 is in a power state in which power can be supplied to the video media control unit 105a (the MPU). "POWER STATE OF SECOND SECONDARY BATTERY" being "LOW" means that the second secondary battery 15 is in a power state in which power cannot be supplied to the video media control unit 105a (the MPU).

[First Mode]

In the first mode, the first secondary battery 14 is charged. In the first mode, the power from the normal charger is supplied to the first secondary battery 14. Specifically, in the first mode, the power distribution control unit 105c controls the power conversion device 106 such that the output of the power conversion device 106 is supplied to the first secondary battery 14.

In the first mode, the charging control unit 200 operates (see FIG. 5). In other words, the power is supplied to the charging control unit 200. In the first mode, no power is supplied to the video media control unit 105a. In the present embodiment, the power control unit 202 controls, e.g., the relay in the battery pack 201 to stop a power supply to the video media control unit 105a. Note that in this case, the power control unit 202 may control the DC/DC converter 107 to stop a power supply to the video media control unit 105a.

[Second Mode]

Charging of First Secondary Battery 14

In the second mode, the first secondary battery 14 is charged. In the second mode, the power from the normal charger is supplied to the first secondary battery 14. Specifically, in the second mode, the power distribution control unit 105c controls the power conversion device 106 such that the output of the power conversion device 106 is supplied to the first secondary battery 14. In this manner, the first secondary battery 14 is charged. While the first secondary battery 14 is being charged, the power control unit 202 transmits information such as the voltage of the first secondary battery 14 to the power distribution control unit 105c.

Power Supply to MPU

In the second mode, the power is supplied to the video media control unit 105a (the MPU). In the second mode, a power supply source for the video media control unit 105a varies according to whether the power state of the second secondary battery 15 (the 12 V battery) is "HIGH" or "LOW." For example, in a case where the power state of the second secondary battery 15 is "HIGH," the power is directly supplied from the second secondary battery 15 to the video media control unit 105a.

In a case where the power state of the second secondary battery 15 is "LOW," the power obtained from the normal charger is supplied to the video media control unit 105a. Specifically, the power distribution control unit 105c controls the power control unit 202 (controls, e.g., the relay in the battery pack 201 or the DC/DC converter 107) such that the output of the power conversion device 106 is input to the video media control unit 105a.

The video media control unit 105a includes the DC/DC converter 107. The DC/DC converter 107 steps down the output voltage (the DC voltage) of the power conversion device 106 to a voltage suitable for the video media control unit 105a. The DC/DC converter 107 supplies the DC voltage generated as described above to the video media control unit 105a. In this manner, the video media control unit 105a is allowed to participate in the grid computing.

As described above, in the second mode, the charging control unit 200 (the OBC) operates. In other words, the power is supplied to the charging control unit 200. In the second mode, the power is also supplied to the video media control unit 105a and the power control unit 202. In the second mode, the control can be made such that no power is supplied to a device unnecessary for operation of the charging control unit 200, the power control unit 202, and the video media control unit 105a.

[Third Mode]

In the third mode, the first secondary battery 14 is not charged.

In the third mode, the power is supplied to the video media control unit 105a and a device for operating the video media control unit 105a. Also in the third mode, a power supply source for the video media control unit 105a varies according to whether the power state of the second secondary battery 15 is "HIGH" or "LOW." In a case where the power state of the second secondary battery 15 is "HIGH," the power is supplied from the second secondary battery 15 to the video media control unit 105a. In a case where the power state of the second secondary battery 15 is "LOW," the power obtained from the normal charger is supplied to the video media control unit 105a.

Specifically, in a case where the power state of the second secondary battery 15 is "HIGH," the power distribution control unit 105c controls the power control unit 202 such that the output of the power conversion device 106 is input to the DC/DC converter 107. The DC/DC converter 107 steps down the output voltage (the DC voltage) of the power conversion device 106 to a voltage suitable for the video media control unit 105a.

The DC/DC converter 107 supplies the DC voltage generated as described above to the video media control unit 105a. In this manner, the video media control unit 105a is allowed to participate in the grid computing.

In the third mode, in a case where the power state of the second secondary battery 15 is "LOW," the power distribution control unit 105c and the power conversion device 106 operate in the charging control unit 200 (the OBC). That is, part of the charging control unit 200 operates. Moreover, in a case where the power state of the second secondary battery 15 is "LOW," the power is supplied to the power control unit 202 and the DC/DC converter 107.

On the other hand, in a case where the power state of the second secondary battery 15 is "HIGH," operation of the charging control unit 200 is not necessary in principle. Note that in some cases, the power distribution control unit 105c operates in the charging control unit 200 for the sake of convenience in power management. That is, part of the charging control unit 200 operates in some cases.

<Case where Vehicle 10 is not Connected to Normal Charger>

While the vehicle 10 is travelling, the vehicle 10 is not connected to the normal charger. In addition, while the vehicle 10 is parked, the vehicle 10 is not connected to the normal charger in some cases. In the vehicle 10, the following three modes (fourth to sixth modes) can be selected as the operation mode in a case where the vehicle 10 is not connected to the normal charger.

(1) A mode (the fourth mode) in which the second secondary battery 15 (the 12 V battery) is charged, but the video media control unit 105a does not participate in the grid computing.
(2) A mode (the fifth mode) in which both charging of the second secondary battery 15 and participation of the video media control unit 105a in the grid computing are performed.
(3) A mode (the sixth mode) in which the second secondary battery 15 is not charged, but the video media control unit 105a participates in the grid computing.

FIG. 6 is a table for describing the power control in a case where the vehicle 10 is not connected to the normal charger. Also in FIG. 6, an OBC means the charging control unit 200. Also in FIG. 6, a circle mark means a state in which a corresponding device operates, and a cross mark means a state in which a corresponding device is stopped.

[Fourth Mode]

In the fourth mode, the second secondary battery 15 is charged with the power of the first secondary battery 14. Specifically, in the fourth mode, the power control unit 202 causes the DC/DC converter 109 (the second step-down circuit) to operate.

The DC/DC converter 109 steps down the DC voltage (e.g., 200 V) supplied from the first secondary battery 14 to a DC voltage (e.g., 12 V) suitable for charging the second secondary battery 15. The DC/DC converter 109 supplies the DC voltage to the second secondary battery 15. In this manner, the second secondary battery 15 is charged.

As described above, in the fourth mode, it is not necessary to operate the charging control unit 200 in order to charge the second secondary battery 15.

[Fifth Mode]

In the fifth mode, the second secondary battery 15 is charged with the power of the first secondary battery 14. Also in the fifth mode, the control similar to that in the fourth mode is performed to charge the second secondary battery 15. That is, also in the fifth mode, the power control unit 202 causes the DC/DC converter 109 (the second step-down circuit) to operate. The DC/DC converter 109 supplies the generated DC voltage to the second secondary battery 15.

In the fifth mode, a power supply source for the video media control unit 105a varies according to whether the power state of the second secondary battery 15 is "HIGH" or "LOW." In a case where the power state of the second secondary battery 15 is "HIGH," the power of the second secondary battery 15 is directly supplied to the video media control unit 105a.

In a case where the power state of the second secondary battery 15 is "LOW," the power of the first secondary battery 14 is supplied to the video media control unit 105a. Specifically, the power distribution control unit 105c controls the power control unit 202 such that the output of the first secondary battery 14 is input to the DC/DC converter 107.

The DC/DC converter 107 steps down the DC voltage input from the first secondary battery 14 to a DC voltage suitable for operation of the video media control unit 105a. As described above, the DC voltage generated by the DC/DC converter 107 is supplied to the video media control unit 105a. In this manner, the video media control unit 105a is allowed to participate in the grid computing.

In the fifth mode, it is not necessary to operate the charging control unit 200 in order to charge the second secondary battery 15. In addition, it is not necessary to operate the charging control unit 200 in order to supply the power to the video media control unit 105a.

[Sixth Mode]

In the sixth mode, the power is supplied to the video media control unit 105a and a device for operating the video media control unit 105a. Also in the sixth mode, a power supply source for the video media control unit 105a varies according to whether the power state of the second secondary battery 15 is "HIGH" or "LOW." In a case where the power state of the second secondary battery 15 is "HIGH," the power of the second secondary battery 15 is directly supplied to the video media control unit 105a.

In a case where the power state of the second secondary battery 15 is "LOW," the first secondary battery 14 is used to supply the power to the video media control unit 105a. Specifically, the power distribution control unit 105c controls the power control unit 202 such that the output of the first secondary battery 14 is input to the DC/DC converter 107.

The DC/DC converter 107 steps down the DC voltage input from the first secondary battery 14 to a DC voltage suitable for operation of the video media control unit 105a. As described above, the DC voltage generated by the DC/DC converter 107 is supplied to the video media control unit 105a. In this manner, the video media control unit 105a is allowed to participate in the grid computing.

In the sixth mode, it is not necessary to operate the charging control unit 200 in order to charge the second secondary battery 15. In addition, it is not necessary to operate the charging control unit 200 in order to supply the power to the video media control unit 105a.

<Advantages of Embodiment>

As described above, in the present embodiment, a control of distributing the power to the secondary batteries 14, 15 and the video media control unit 105a (the MPU) can be made. In the case of charging the second secondary battery 15 with the power of the first secondary battery 14, it is not necessary to activate the charging control unit 200. That is, the components of the charging control unit 200 are activated as necessary. According to the present embodiment, power consumption in the vehicle can be reduced.

The DC/DC converter 107 and the video media control unit 105a are provided separately. Since the video media control unit 105a and the DC/DC converter 107 are arranged separately, the degree of freedom in vehicle design is improved.

[Other Embodiments]

The computer participating in the grid computing is not limited to the video media control unit 105a (a first computer). In addition to the video media control unit 105a, other computers may be allowed to participate in the grid computing.

In the first to third modes, part or the entirety of the process performed by the power distribution control unit 105c may be performed by the video media control unit 105a. For example, if the video media control unit 105a performs the entirety of the process performed by the power distribution control unit 105c, the power distribution control unit 105c is not necessarily provided.

In the above-described embodiment, the DC/DC converters 107, 109 are provided separately, but may be provided as a common converter. In this case, the DC/DC converter steps down the DC voltage input from the first secondary battery 14, and supplies the stepped-down DC voltage to the second secondary battery 15 and the video media control unit 105a.

The above-described embodiments may be implemented in combination, as necessary. The above-described embodiments are merely examples in nature, and are not intended to limit the scope, applications, or use of the technique disclosed herein.

What is claimed is:

1. A vehicle power supply system comprising:
a first secondary battery configured to supply power to a traction motor;
a second secondary battery whose output voltage is lower than that of the first secondary battery and which is configured to supply power to a trip computer and a device related to traveling of a vehicle;
a DC power supply unit configured to convert an AC voltage input from a charger, into a DC voltage to output the DC voltage;
a battery pack configured to receive the DC voltage output from the DC power supply unit and charge the first secondary battery housed inside;
a first step-down circuit configured to step down the DC voltage input from the battery pack to output the stepped-down DC voltage;
a second step-down circuit configured to step down the DC voltage input from the battery pack to output the stepped-down DC voltage; and
a control device configured to manage the outputs of the first step-down circuit and the second step-down circuit which have received the inputs from the battery pack,
the first secondary battery being connected to an input port of the first step-down circuit and an input port of the second step-down circuit via a bus in the battery pack,
an output port of the first step-down circuit being connected to a non trip computer of the vehicle which participates in grid computing outside the vehicle,
an output port of the second step-down circuit being connected to the second secondary battery, and
when the charger is connected to the DC power supply unit, the vehicle operates in a first mode in which the first secondary battery is charged, but participation in the grid computing is not performed.

2. The vehicle power supply system of claim 1, wherein the control device has a control mode of controlling the battery pack to supply an output of the DC power supply unit to the first secondary battery.

3. The vehicle power supply system of claim 1, wherein the control device has a control mode of controlling the battery pack to supply the output of the DC power supply unit to the trip computer.

4. The vehicle power supply system of claim 1, wherein the control device has a control mode of supplying a power of the second secondary battery to the trip computer in a case where the power of the second secondary battery is equal to or greater than a predetermined value.

5. The vehicle power supply system of claim 1, wherein the control device has a control mode of stepping down the output of the first secondary battery by the second step-down circuit and supplying an output of the second step-down circuit to the second secondary battery.

6. The vehicle power supply system of claim 1, wherein the control device receives power supply from the first step-down circuit.

7. A vehicle power supply system comprising:
a first secondary battery configured to supply power to a traction motor;
a second secondary battery whose output voltage is lower than that of the first secondary battery and which is configured to supply power to a trip computer and a device related to traveling of a vehicle;
a DC power supply unit configured to convert an AC voltage input from a charger, into a DC voltage to output the DC voltage;
a battery pack configured to receive the DC voltage output from the DC power supply unit and charge the first secondary battery housed inside;
a first step-down circuit configured to step down the DC voltage input from the battery pack to output the stepped-down DC voltage;
a second step-down circuit configured to step down the DC voltage input from the battery pack to output the stepped-down DC voltage; and
a control device configured to manage the outputs of the first step-down circuit and the second step-down circuit which have received the inputs from the battery pack,
the first secondary battery being connected to an input port of the first step-down circuit and an input port of the second step-down circuit via a bus in the battery pack, an output port of the first step-down circuit being connected to a non trip computer of the vehicle which participates in grid computing outside the vehicle, an output port of the second step-down circuit being connected to the second secondary battery, when the charger is connected to the DC power supply unit, the vehicle operating in a charging and grid computing mode, in which charging of the first secondary battery and participation in the grid computing are both performed.

8. A vehicle power supply system comprising:

a first secondary battery configured to supply power to a traction motor;

a second secondary battery whose output voltage is lower than that of the first secondary battery and which is configured to supply power to a trip computer and a device related to traveling of a vehicle;

a DC power supply unit configured to convert an AC voltage input from a charger, into a DC voltage to output the DC voltage;

a battery pack configured to receive the DC voltage output from the DC power supply unit and charge the first secondary battery housed inside;

a first step-down circuit configured to step down the DC voltage input from the battery pack to output the stepped-down DC voltage;

a second step-down circuit configured to step down the DC voltage input from the battery pack to output the stepped-down DC voltage; and a control device configured to manage the outputs of the first step-down circuit and the second step-down circuit which have received the inputs from the battery pack, the first secondary battery being connected to an input port of the first step-down circuit and an input port of the second step-down circuit via a bus in the battery pack, an output port of the first step-down circuit being connected to a non trip computer of the vehicle which participates in grid computing outside the vehicle, an output port of the second step-down circuit being connected to the second secondary battery, when the charger is connected to the DC power supply unit, the vehicle operating in a non-charging and grid computing mode, in which the first secondary battery is not charged but participation in the grid computing is performed.

\* \* \* \* \*